United States Patent [19]

Carson

[11] 4,110,174
[45] Aug. 29, 1978

[54] POWER GENERATION AND POTABLE WATER RECOVERY FROM SALINOUS WATER

[75] Inventor: Don B. Carson, Mt. Prospect, Ill.

[73] Assignee: UOP Inc., Des Plaines, Ill.

[21] Appl. No.: 751,424

[22] Filed: Dec. 16, 1976

[51] Int. Cl.$^2$ .............................................. B01D 3/06
[52] U.S. Cl. ...................................... 203/11; 60/648;
203/DIG. 1; 203/DIG. 16; 203/DIG. 20;
203/100; 202/173; 202/234
[58] Field of Search ................... 203/11, 100, DIG. 1,
203/DIG. 17, DIG. 20, DIG. 16, 73, 80, 91;
202/173, 174, 234, 181; 60/641, 648; 159/15,
16, 24 A

[56] References Cited

U.S. PATENT DOCUMENTS

| 2,006,985 | 7/1935 | Claude et al. | 203/10 |
|---|---|---|---|
| 3,105,020 | 9/1963 | Silver et al. | 202/173 |
| 3,257,290 | 6/1966 | Starmer | 202/173 |
| 3,511,756 | 5/1970 | Guerrieri | 202/173 |
| 3,908,381 | 9/1975 | Barber et al. | 60/641 |
| 3,926,739 | 12/1975 | Izumi | 202/173 |
| 3,928,145 | 12/1975 | Othmer | 203/DIG. 1 |
| 3,966,562 | 6/1976 | Mukushi et al. | 202/173 |
| 3,969,193 | 7/1976 | Sakuma et al. | 202/173 |

Primary Examiner—Wilbur L. Bascomb, Jr.

Attorney, Agent, or Firm—James R. Hoatson, Jr.; Robert W. Erickson; William H. Page, II

[57] ABSTRACT

A process for simultaneously generating power and recovering potable water from a source of salinous water — e.g. ocean and/or sea water. A first portion of salinous water, from the surface of the source, or from a colder, deeper depth, is increased in temperature via indirect contact with a plurality of non-salinous vaporous phases (i) derived from the salinous water and, (ii) obtained therefrom at an elevated temperature and a subatmospheric pressure. The warmed salinous water is further increased in temperature by being maintained in a solar radiation heat sink and exposed therein to radiant solar energy to increase its temperature to a level within the range of about 135° F. to about 210° F. Heated salinous water is introduced into a plurality of vacuum flash separation zones, each succeeding one of which is maintained at a lower absolute pressure. At least one of the resulting vaporous phases is passed into and through a turbine, from the resulting motion of which power is generated. The remaining vaporous phases, and at least two, are successively used to preheat the first salinous water portion prior to the introduction thereof into the solar radiation heat sink. Exiting vapors from the turbine and the vaporous phases employed in the salinous water preheat system are cooled and/or condensed via indirect contact with a second salinous water portion to recover potable water.

11 Claims, 1 Drawing Figure

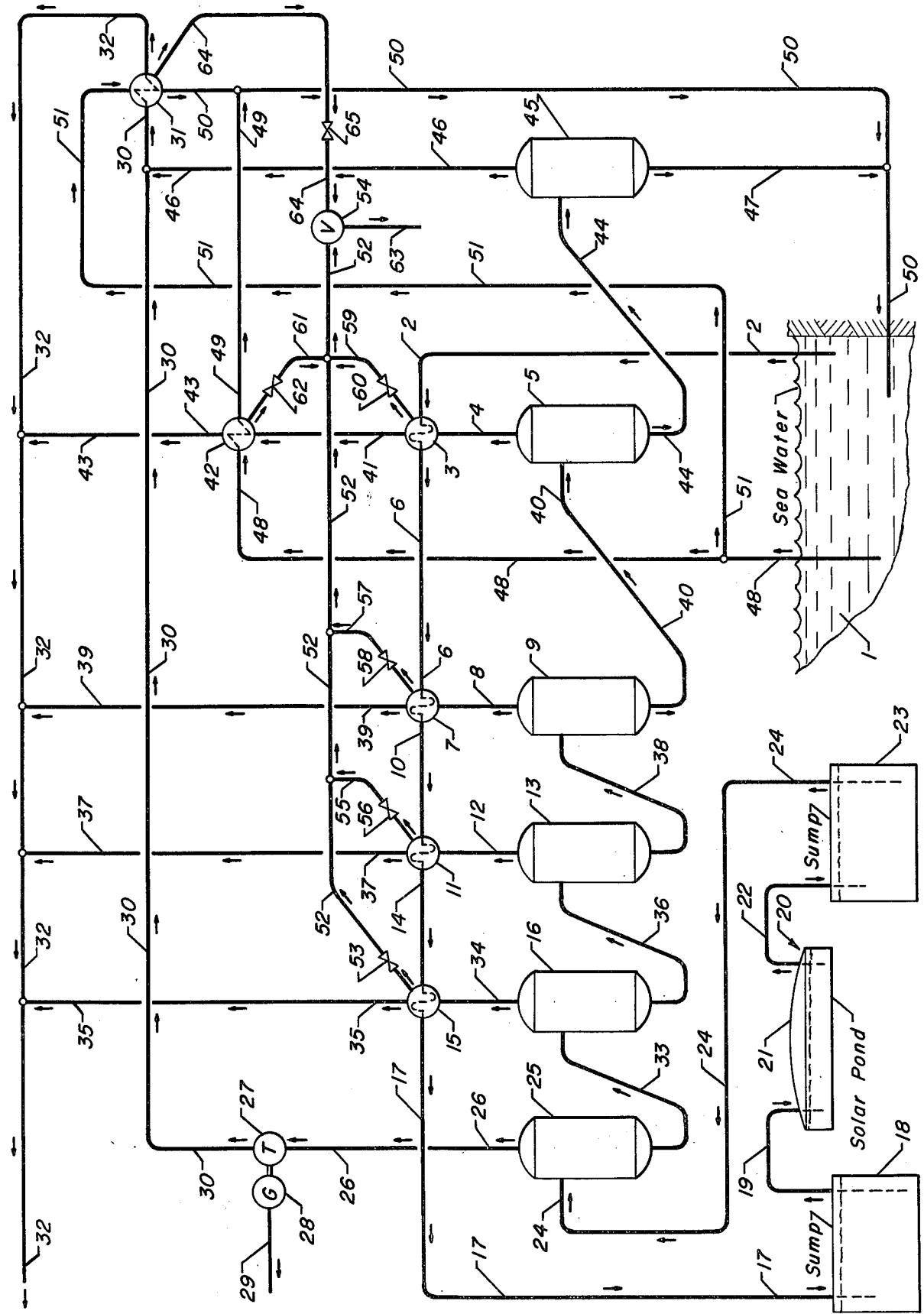

POWER GENERATION AND POTABLE WATER RECOVERY FROM SALINOUS WATER

APPLICABILITY OF INVENTION

According to many knowledgeable scientific experts, the world is currently entering into a period of time which future historians may well refer to as the "energy shortage" age. Whether considering (1) the availability of natural gas, (2) the sufficiency of oil reserves, or (3) untapped sources of coal, the consensus appears to indicate that a severe energy crisis is, or will soon become an established fact. One consequence, of course, is that a corresponding shortage of electrical power can be foreseen; that is, it will no longer be practical to convert one or more of these energy sources into electrical power. To alleviate this situation, consideration is currently being given to ocean thermal energy conversion, utilizing existing thermal gradients. The basic concept, first proposed by a French physicist as early as 1881, involves operating a heat engine, using warm surface water as the heat source, and cold water, from the ocean depths, as the heat sink.

In many parts of the world, particularly in arid, desert-like countries, a critical shortage of potable water, both for human consumption and for irrigation, exists. Although sparsely located throughout the world, such areas abound particularly in the Middle Eastern countries and the Northern desert regions of Africa. Coincidentally, many of these countries, or localized areas thereof, either border upon, or are readily accessible to sea and/or ocean waters. Likewise coincidental is the fact that many of these areas have an apparent inexhaustible reserve of fossil fuel to convert, albeit inefficiently and uneconomically, into electrical power. Exemplary of such areas would be Kuwait and Saudi Arabia, the Western coast of the latter bordering upon the Red Sea. The process encompassed by my inventive concept, although not limited to such areas, in principally applicable thereto.

The invention herein described is specifically directed toward a technique for recovering potable water from otherwise impotable water, while simultaneously generating power. Although applicable to the processing of many types of brackish water and/or water having a high degree of salinity, the inventive concept is principally directed toward the recovery of potable water from sea and/or ocean water. However, where energy is also in short supply and somewhat great demand, the present process can be tailored for the simultaneous generation of power and the recovery of potable water. Great flexibility, with respect to varying quantities of each, is afforded.

Briefly, the present invention involves the use of a combination of available ocean thermal energy and the natural solar energy supply. Initially, a first salinous sea water portion is increased in temperature by way of successive indirect heat-exchange with a plurality of non-salinous vaporous phases which have been obtained, at various subatmospheric pressures and elevated temperatures, from the salinous sea water. Following this initial preheat, the salinous water portion is introduced into a solar radiation heat sink, wherein it is exposed to radiant solar energy. The temperature is increased considerably, to a level from 135° F. (56.8° C.) to about 210° F. (99° C.), and the heated salinous water is introduced into a plurality of vacuum flash separation zones; salinous liquid phases pass through the plurality of vacuum flash zones in series. The vacuum flash zones are maintained at successively lower absolute pressures to provide a plurality of vaporous phases equal in number to the number of vacuum flash zones.

At least one of the resulting vaporous phases is passed through a turbine, from the resulting motion of which power is generated. Where additional power is required, and more than one vaporous phase is utilized in generating the same, the vapors may be introduced into separate turbines functioning in tandem, or into different stages of a multiple-stage turbine. The remaining vaporous phases are each employed to increase the temperature of the first portion of salinous water, prior to the introduction thereof into the solar radiation heat sink. These remaining vaporous phases are used consecutively in the order of increasing temperature. Following use in the preheat system, the vaporous phases are recovered as potable water. The last salinous liquid phase, obtained from the last vacuum flash zone in the plurality, is preferably introduced into a final vacuum flash chamber, maintained at a lower absolute pressure than the last flash zone in the plurality, to provide a final non-salinous vaporous phase, from which additional potable water is recovered, and a final liquid phase. The final non-salinous vaporous phase and the exiting vapors from the turbine are cooled and/or condensed via indirect contact with a second portion of the salinous sea water. The final liquid and vaporous phases are obtained at a temperature not more than 15° F. greater than the temperature of the second salinous water portion. This final salinous liquid phase is then returned to the source of the original salinous water. Where an ocean thermal gradient is non-existent, or at best only a few degrees even when the second portion is obtained from a depth considerably below the surface, the first and second salinous water portions may both be obtained from a depth which is proximate to the surface of the source. On the other hand, where a thermal gradient of at least about 5.0° F. to about 15° F. exists at a reasonable depth below the surface, the first salinous water portion may be obtained at the higher temperature, while the second portion is obtained at the lower depth and temperature.

As hereinafter discussed in greater detail, a most important variable constitutes the temperature to which the surface water is increased within the solar radiation heat sink. Also of major importance is the temperature differential between the surface water and colder water selected from some finite depth below the surface, where natural thermal gradients exist. Regardless of the temperature of the salinous water charged to the initial flash separation zone, judicious operating techniques require the utilization of virtually all of the resulting temperature differential with respect to the water obtained at the lowest temperature from the sea water source. To illustrate, where (1) surface water is available at about 85° F. (29.4° C.), (2) colder, deeper water is obtainable at about 65° F. (18.3° C.), or a temperature differential of 20° F. (11.2° C.), and, (3) the surface water is increased to a temperature of 170° F. (76° C.), available energy is lost and/or wasted where salinous water is returned to the source at a temperature substantially greater than that of the colder sea water. Likewise, the radiant energy absorbed in going from 85° F. to 170° F., a differential of 85° F., or a differential of 105° F. with respect to the colder water, should be utilized virtually 100.0%. The process encompassed by the present invention makes such utilization economically possible.

OBJECTS AND EMBODIMENTS

A principal object of the present invention involves the generation of power and the recovery of potable water from a source of salinous water. A corollary objective resides in the utilization of a combination of solar energy with the natural temperature gradients existing at varying depths of the oceans and seas.

Another object is directed toward increasing the effective degree to which utilization of the radiant solar energy, absorbed in the solar radiation heat sink, is utilized in conjunction with the available ocean thermal gradient.

A specific object of my invention involves providing a technique for preheating the salinous surface water prior to introducing the same into the solar radiation heat sink, thereby considerably reducing the size of the heat sink required to satisfy process design. These objects are readily achieved through the utilization of a process for simultaneously recovering potable water and generating power from a source of salinous water, which process comprises the sequential steps of: (a) increasing the temperature of a first portion of said salinous water via indirect successive contact with a plurality of non-salinous vaporous phases which are (i) derived from said first salinous water portion and, (ii) obtained therefrom at elevated temperature and subatmospheric pressure; (b) introducing said first salinous water portion into a solar radiation heat sink, and therein exposing said first portion to radiant solar energy for a time sufficient to raise its temperature to a level of at least about 135° F.; (c) introducing the thus-heated first salinous water portion into a plurality of flash separation zones, each succeeding one of which is maintained at a lower subatmospheric pressure, to provide a plurality of non-salinous vaporous phases, and through which the salinous liquid phase passes in series flow; (d) introducing at least one of said vaporous phases into a turbine, and generating power from the resulting motion thereof; (e) indirectly contacting said first salinous water portion, prior to the introduction thereof into said solar radiation heat sink, with each of the remaining vaporous phases in said plurality, and in the order of increasing temperature, and recovering potable water from said remaining plurality of non-salinous vaporous phases; and, (f) indirectly contacting the exit vapors from said turbine with a second portion of said salinous water to recover additional potable water.

In a more specific embodiment, the salinous liquid phase, obtained from the last flash zone in said plurality, is introduced into a final flash separation zone, maintained at a lower absolute pressure than said last flash zone to provide a final non-salinous vaporous phase and a final salinous liquid phase, cooling said final vaporous phase via indirect contact with said second portion of said salinous water, to recover additional potable water, said final liquid and vaporous phases being provided at a temperature not more than 15° F. greater than the temperature of said second salinous water portion, and returning said final salinous liquid phase to the source of said salinous water.

Other objects and embodiments, of the potable water recovery and power generation process encompassed by my inventive concept, will become evident from the following more detailed description. In another such embodiment, the first salinous water portion is maintained within the solar raidation heat sink for a time sufficient to increase its temperature to a level in the range of about 160° F. (71° C.) to about 210° F. (99° C.), while the final flash separation zone, when integrated into the process to increase the amount of recovered potable water, will be maintained at a subatmospheric pressure within the range of about 0.25 psia. (12.93 mm. of Hg.) to about 0.75 psia. (38.79 mm. of Hg.).

PRIOR ART

It would appear that the greater proportion of available prior art consists of articles published in the various trade and scientific journals. Two examples of these will be discussed hereinbelow. With respect to issued patents, these are principally directed toward various devices capable of utilizing radiant solar energy for (1) heating homes and other structures, and, (2) the desalination of non-potable water. For example, respecting the latter, U.S. Pat. No. 2,803,591 (Cl. 202-234), issued Aug. 20, 1957, directs itself to a form of solar still for the purification of undrinkable water. This impure water is sprayed into a closed and well-insulated chamber containing hot, dry air which becomes enriched with water vapor. The saturated hot air is withdrawn and cooled, yielding a condensate which is recovered as potable water. The device utilizes a complicated series of mirrors to concentrate the rays of the sun for the purpose of heating the air which is introduced into the spray chamber.

In U.S. Pat. No. 2,813,063 (Cl. 202-234) issued Nov. 12, 1957, there is described a solar still having a wick which becomes saturated with salt water. Solar radiation heats the wick and causes evaporation of water. The still is constructed from a semi-rigid, flexible material such as polyethylene which is transparent with respect to solar radiation. A similar solar still, absent the wick, is illustrated in U.S. Pat. No. 2,848,389 (Cl. 202-234), issued Aug. 19, 1958.

An article entitled "Efforts to Tap Ocean Thermal Energy Gain", *Chemical and Engineering News*, Feb. 9, 1976, pp. 19-20, in part discusses the use of the available ocean thermal gradients. In one particular system, a working fluid such as propane or ammonia is employed in a closed Rankine cycle. Warm surface water passes through a heat exchanger-evaporator, causing vaporization of the working fluid. The vapor is expanded in a turbine to generate electric power. From the turbine, the vapor passes to a heat exchanger-condenser, where it is cooled and condensed by cold deep ocean water, and recycled to the heat exchanger-evaporator. Since the practical maximum differential temperature available between surface water and deep water is not appreciably greater than 40° F., this technique suffers from an extremely low thermodynamic cycle efficiency, and is, therefore, quite impractical on a commercial scale.

Of further interest is an article entitled "Desalination of Sea Water Using Solar Radiation Under Retarded Evaporation Conditions", *Industrial Engineering Chemistry, Process Design Development*, Volume 14, No. 4, 1975, pp. 351-358. Described is a desalination process which primarily uses the temperature difference between the surface sea water and the deep sea water. A shallow pond, swamp area, or a large heating flat is proposed for use as a radiant energy sink. Water, from the surface, is pumped into the pond where it is heated by solar radiation. An insoluble monolayer, or a thin, transparent plastic sheet on the water surface is used to suppress evaporative heat loss from the water layer.

The heated water is fed into a heat-exchanger which, in actuality, is a vacuum chamber. The warm sea water partly flash evaporates while it runs down a packed section. The vapor condenses in an adjoining section over cooling coils being supplied with colder deep sea water, which cooling water is returned to the sea.

U.S. Pat. No. 3,928,145 (Cl. 203-11), issued Dec. 23, 1975, is specifically referred to in an article entitled "Power, Fresh Water and Food from the Sea", *Mechanical Engineering*, September, 1976, pp. 27-34. All of the subject matter which appears in the article can be found in the issued patent, the latter being more inclusive. Therefore, the discussion which follows will be specifically directed toward the pertinency of the issued patent, from which the present invention can be readily distinguished. As initially described, in general terms, combined use is made of solar radiation and the thermal gradients existing between surface and deep sea water. Warm surface water, from tropic seas, is increased in temperature through the use of a solar heater; the heated sea water is flash evaporated, or boiled at subatmospheric pressure, in a single vacuum flash zone. Sensible heat of the water leaves as vaporous heat, and the steam formed, as the sea water cools, expands to a lower pressure in a turbine, or other steam engine which drives a generator. The exit vapors are passed into a condenser wherein they are condensed via indirect heat-exchange with cold water from the depths of the sea. As an integral part of the process, the heated sea water from the condenser is introduced into a mariculture system which produces at least one specie of food fish; water from the mariculture operation is passed into the solar heater and therefrom into the flash boiler, the discharge water from which is returned to the sea.

Briefly referring to the accompanying drawing, it is quite clear that there is no prior art recognition of a multiple-flash system for the recovery of potable water while simultaneously preheating the salinous sea water charged to the system utilizing the vaporous phases from the vacuum flash zones. Likewise, the prior art does not contemplate the use of multiple vacuum flash stages for the simultaneous generation of power and potable water recovery. While a so-called multiple-flash evaporator is alluded to in U.S. Pat. No. 3,928,145, it is described as being intended solely for the recovery of potable water without power recovery, and is actually directed toward multiple-stage condensation. As stated in this reference, surface sea water is available at 86° F. (30° C.), and may be increased in temperature to 95° F. (35° C.) by admixing therewith the warm water effluent from mariculture pools, or to 175° F. (78.8° C.) by flowing ponds having black bottoms and transparent covers. When utilizing a single flash evaporation zone to generate power and recover potable water, the sea water becomes cooled to a temperature of 77° F. (25° C.); at this temperature, the subatmospheric pressure within the flash evaporator is 0.46 psia. (23.8 mm. of Hg.). The resulting vaporous phase is passed through a turbine, and the exit vapors condensed to 59° F. (15° C.) using cold sea water which is available at a temperature of 41° F. (5° C.), the latter (following condensation) increases in temperature to 50° F. (10° C.). The resulting flash evaporated liquid phase, at 77° F. (25° C.), is directly returned to the source of the sea water. In so doing, the disclosed process effectively wastes the available 18° F. (10° C.) temperature differential between 59° F. (15° C.) and 77° F. (25° C.), as a result of not contemplating a second flash evaporation of the 77° F. (25° C.) liquid phase to a temperature of 59° F. (15° C.), which would be effected at a subatmospheric pressure of about 0.25 psia. (12.9 mm. of Hg.). In effect, there exists a waste of about 18 BTU/lb. of water returned to the sea at 77° F. (25° C.).

By way of further illustration, the present invention, as shown in the accompanying FIGURE, will be compared to that encompassing the prior art process as exemplified by U.S. Pat. No. 3,928,145, above described. In so doing, the variables of the prior art process will be used; that is, it will be presumed that surface sea water is available at 86° F. (30° C.), heated surface water at 175° F. (78.8° C.) and colder, deeper water at 41° F. (5° C.). A charge rate of 5.0 MM lb/hr. (2.27 MM kg/hr.) of salinous water will be employed as the basis for comparison. As above stated, the reference uses a single flash zone to reduce the 175° F. (78.8° C.) water to 77° F. (25° C.); the single subatmospheric flash is, therefore, effected at a pressure of about 0.46 psia. (23.8 mm. of Hg.). This provides about 9.33 lb/hr. (4.24 kg/hr.) of vapor per 100 lb/hr. (45.45 kg/hr.) of salinous water charge, or 466,500 lb/hr. (212,045 kg/hr.) total. After passing through the turbine, the vapors are condensed to 59° F. (15° C.) to recover about 1.35 MM gal/day (1.12 Imp. gal/day) of potable water; therefore, the pressure on the downstream side of the turbine is 0.25 psia. (12.9 mm. of Hg.). It is a general proposition that the work developed in a turbine is proportional to the ratio of the pressures across the turbine; that is, the ratio of the pressure of the vapors introduced, to the pressure of the existing vapors. By using a single turbine for generating power, the disclosed procedure has an effective pressure ratio closely approximating 0.46/0.25, or about 1.84:1.0. Where multiple flash systems are used for power generation, there is afforded an increase by virtue of the fact that at least one turbine has a pressure ratio greater than 1.84:1.0. The above-described prior art technique will generate about 6,050 HP-hrs. (4,510 kw-hrs.) of power.

In accordance with the basic technique of the present invention, a first flash zone is used to reduce the 175° F. (78.8° C.) salinous water to a temperature of, for example, about 140° F. (60° C.) at a subatmospheric pressure of about 2.89 psia. (149.5 mm. of Hg.). This first vacuum flash zone will provide about 3.45 lb/hr. (1.57 kg/hr.) of vapors and 96.55 lb. (43.89 kg/hr.) of a salinous liquid phase, per 100 lb/hr. (45.45 kg/hr.) of original salinous water charged. The vaporous phase passes through the turbine, and the exiting vapors condensed to 59° F. (15° C.) at a subatmospheric pressure of 0.25 psia. (12.9 mm. of Hg.). The effective pressure ratio across the turbine is, therefore, 2.89/0.25 or about 11.6:1.0. Power is generated, on the basis of 5.0 MM lb/hr. (2.27 MM kg/hr.) sea water charge, in the amount of 9,762 HP-hrs., or 7,278 kw-hrs., an increase of 61.4% over the prior art. The salinous liquid phase is introduced into a second flash zone maintained at a subatmospheric pressure of about 1.69 psia. (87.4 mm. of Hg.) and a temperature of about 120° F. (49° C.). Vapors are provided in an amount of 1.88 lb/hr. (0.85 kg/hr.), and the salinous liquid phase in an amount of about 94.67 lb. (43.03 kg/hr.), per 100 lb/hr. (45.45 kg/hr.) of sea water charged. The liquid phase is introduced into a third vacuum flash zone, maintained at about 100° F. (37.8° C.) and a subatmospheric pressure of about 0.95 psia. (49.13 mm. of Hg.). The vaporous phase, in the amount of about 1.83 lb. (0.83 kg/hr.) per 100 lb/hr. salinous water charged, is used to preheat the 86° F. (30.0° C.)

surface water to a temperature of about 97° F. (36.1° C.). In so doing, about 1.06 lb. (0.48 kg/hr.) of vapors, per 100 lb/hr. of original salinous water charged, condense.

The preheated salinous water is then indirectly contacted with the 120° F. (49° C.) vapors from the second flash zone, and its temperature further increased to about 116° F. (46.3° C.). The thus-heated salinous water is then introduced into the solar pond wherein its temperature is raised to the aforesaid 175° F. (78.8° C.). Obviously, preheated salinous water will necessitate a much smaller solar pond than the prior art process; on the basis of the solar pond duty, the prior art process requires about 51% more, where the surface water is introduced at 86° F. (30° C.). Considering that use of the warmed water from the mariculture pools would first increase this to 95° F. (35° C.), the prior art process requires about 35.6% more solar pond duty. Similarly, a heat sink of the same size and efficiency, and exposed to the same degree of insolation, will be capable of increasing the preheated sea water temperature to a level above 175° F. (78.8° C.).

As above stated, the reference process does not contemplate a final flash to 59° F. (15° C.), for the purpose of recovering additional potable water. When this is, however, effected in the present process at 0.25 psia. (12.9 mm. of Hg.), an additional 3.59 lb/hr. (1.63 kg/hr.) of vapors are produced. Thus, where the prior art process results in 466,500 lb/hr. (212,045 kg/hr.) of potable water, or about 1.35 MM gal/day (1.12 MM Imp. gal/day), the present process, as briefly outlined above, produces about 537,500 lb/hr. (244,318 kg/hr.), or about 1.55 MM gal/day (1.29 MM Imp. gal/day), an increase of about 15.1%. It must be reiterated that the known prior art does not recognize the concept of preheating the salinous water charge with a vaporous phase obtained therefrom.

SUMMARY OF INVENTION

The present invention offers a feasible process which is capable of currently being commercially acceptable. With respect to the technology demand imposed upon an installation of given capacity, there is afforded great flexibility in regard to the relative amount of generated power and the quantity of potable water recovered. That is, a commercial unit, employing a solar radiation heat sink of a given size (generally determined by the incidence of solar energy, or the available insolation, and the efficiency of the solar radiation heat sink), can be readily designed to vary the relative quantities of generated power, depending upon the load demand, and the amount of potable water recovery, which decreases somewhat as the generated power increases.

However, as hereinbefore stated, the present process is principally directed toward potable water production with minimal power generation, although the same can be modified to generate additional power where necessary. Preferably, the process involves the utilization of a plurality of subatmospheric flash zones, each succeeding one of which functions at a lower absolute pressure than the preceding flash zone, to produce a plurality of vaporous phases, each succeeding one of which is at a lower temperature than the preceding. The number of flash zones is principally dependent upon a consideration of the economics involved in increasing the number of zones compared to the size of the solar radiation heat sink, and the relative quantities of generated power and potable water desired.

In accordance with the present invention, power is generated from at least one of the first flash separation zones through which the salinous water from the solar radiation heat sink is initially introduced, and at least two subsequent flash zones are utilized in preheating the original salinous water charged to the installation. Generally, the number of such preheat zones will be in the range of from three to about twenty, although from four to about ten would appear to be more practical from an economic viewpoint. The salinous sea water will consecutively, indirectly contact each of the resulting vaporous phases in the order of increasing temperature. For example, as illustrated in the accompanying drawing, the plurality of flash zones may number five, not counting the final flash zone used to recover additional water. The salinous water from the solar radiation heat sink will be introduced into these five flash zones in the order I, II, III, IV and V, or in the order of decreasing temperature. Power will be generated from the vapors emanating from flash zone I, with flash zones II, III, IV and V constituting the preheat system in which the salinous sea water indirectly and consecutively contacts the vaporous phases in the order V, IV, III and II, or in the order of increasing temperature. Where additional power is deemed desirable, albeit at the expense of a portion of the available preheat, it may be generated from flash zones I and II, with the resulting vaporous phases being introduced into separate turbines, or into different stages of a multiple-stage turbine. In this case, the salinous sea water would indirectly contact the remaining three vaporous phases in the order V, IV and III. In all situations, it is preferred that the salinous liquid phase from the last flash zone V in the plurality be introduced into a final flash zone VI. Where appropriate and/or desired — i.e. a natural thermal gradient of at least about 5° F. (2.8° C.) to about 15° F. (8.3° C.), or higher, exists and is readily obtained — a final flash to a temperature not more than 15° F. (8.3° C.) greater than the lowest temperature of the sea water removed from the source, may be employed to produce a vaporous phase from which additional potable water may be recovered. The final flash zone can, of course, be employed where a thermal gradient is, for all practical purposes, non-existent. Thus, where the surface water is available only at about 70° F. (21.1° C.), the last flash zone in the preheat plurality may function at about 0.95 psia. (49.13 mm. of Hg.), to produce vapors at a temperature of about 100° F. (37.8° C.), which vapors are indirectly contacted first by the 70° F. (21.1° C.) water. A final flash, say to 75° F. (23.9° C.) will produce additional vapors which may be condensed via indirect contact with a second portion of the 70° F. (21.1° C.) sea water. It is readily apparent that the inventive concept herein described encompasses a process which affords great flexibility in providing the most economical and practical design of an installation in a given area, based upon the availability of ocean thermal gradients and the degree of insolation.

The preheated salinous sea water is introduced into a solar radiation heat sink, the exact dimensions of which are primarily dependent upon the available insolation. Insolation may be conveniently expressed as the quantity of B.T.U.'s, from the sun, falling upon a square foot of heat sink surface per day, or the incidence of solar energy. Solar radiation heat sinks may take the form of flat plate collectors, or, in the interests of capital investment enhancement, a shallow solar pond. The latter constitutes an economical device for capturing a portion of the insolation falling upon it from the sun, whenever only moderate temperatures of the heated water are required. The heated surface sea water is pumped into the solar radiation heat sink to a depth which varies seasonally, much the same as the insolation from the sun varies seasonally. Depending upon the season, as well as the desired temperature of the heated water, a solar pond depth in the range of about one to about ten inches is acceptable, although a depth from two to about eight inches appears to be the most practical. The length and width of the solar pond are generally determined by the terrain and climate which are peculiar to the locale of the unit. The temperature to which the water in the solar pond is heated, prior to being charged to the process, depends upon the relative quantities of potable water and generated power which the selected installation is designed to deliver. For example, a solar pond receiving insolation in the amount of 3,000 BTU/sq.ft./day, and functioning at an efficiency of about 60.0%, would heat a three-inch level of water from a temperature of about 85° F. (29.4° C.) up to about 200° F. (93° C.) during a period of approximately 10 daylight hours. Where the 85° F. (29.4° C.) water is first preheated to a temperature of about 116° F. (46.3° C.), in accordance with my invention, the size of the pond could be decreased significantly. Solar pond efficiency is determined by a comparison of its absorptivity with the total insolation available, and should be such that the sea water attains a temperature level of at least about 135° F. (56.8° C.), and preferably a temperature of about 160° F. (71° C.) to about 210° F. (99° C.).

In order to increase the efficiency of the solar pond, evaporative heat loss therefrom is inhibited through the use of a covering. Suitable coverings are those which are transparent to solar radiation, while simultaneously being opaque to long wave radiation. Additionally, a suitable covering will provide an insulating effect between the water being heated and the atmosphere, such that conductive and convective heat loss is minimized. For example, one such suitable covering would be hollow glass balls, or beads having a nominal diameter of about ¼-inch to about ½-inch, disposed in a layer from about ¼-inch to about 2 inches thick. A relatively thin (4 to about 6 mils) sheet of polyvinyl chloride can be suitable employed, as can two such sheets which are uniformly tacked to provide a multitude of air bubbles having a minimum air gap of about 1 inch. The plastic sheet can be used in combination with an underlayer of acrylic, fiberglass, polyvinyl carbonate, or other plastic which is opaque to long wave radiation, and which is formed into a modified sine wave having angles of about 45° to about 75°. Other suitable coverings include glass wool which is reinforced with plastic, opaque to long wave radiation, in combination with a tacked polyvinyl chloride sheet; a mat of fused polyvinyl chloride bubbles, about 1 to 2 inches thick; and, a combination of polyvinyl chloride-coated fiberglass to which the polyvinyl sheet is uniformly tacked.

Also of importance, with respect to the efficiency of the solar pond, is the insulation of the sides and bottom thereof. Several techniques to accomplish this will become evident to those possessing the requisite skill in the appropriate art. For instance, the solar pond can be lined with a thin, black sheet of polymeric material, such as polyethylene, polyvinyl chloride, polyvinyl carbonate, etc., disposed over a layer of dry sand, crushed shells, etc. A variety of commercially available insulating material, such as styrofoam, vermiculite, etc., can be used as the lining over which the black sheet of polymeric material is placed. Insulating material can be foamed on and thus become integral with the polymeric sheet, or the polymeric material can be impregnated with an inorganic substance having a high absorptivity/emissivity ratio; this may be copper oxide, nickel oxide, black nickel, etc.

Following the prescribed period of exposure to solar radiation, during which the temperature of the surface sea water in the pond is increased to a level of at least about 135° F. (56.8° C.), preferably from 160° F. (71° C.) to about 210° F. (99° C.), and at such time as the water has reached its maximum temperature for the day, the heated salinous water is drained into a hot water storage pond, or sump. Similarly, the preheated surface water is introduced into a storage pond, or sump, capable of storing a 24-hour supply, and introduced therefrom into the solar pond. The size of both storage ponds, or sumps, depends upon the design capacity of the unit; however, they should be capable of storing at least a 24-hour supply of the heated salinous water. To reduce the loss of energy from the surface of the sump, it is preferred that the depth thereof be significantly greater than its length and width. Furthermore, the storage pond should be covered and lined much the same as the solar pond.

In further describing my invention, it will be assumed (1) that surface sea water is available at a temperature of about 85° F. (29.4° C.), (2) that the sea water temperature about 450 feet below the surface is approximately 70° F. (21.1° C.) and, (3) the salinous water charge rate is about 5.0 MM lb/hr. (2.27 MM kg/hr.). Also, that insolation from the sun, at the period of the year being considered is about 3,000 BTU/sq.ft./day, and that a reasonably efficient (about 50.0%) solar pond is being employed as the solar radiation heat sink. The solar pond will be one which covers about 90 to about 135 acres and has a depth of about 3 inches; during approximately ten daylight hours, this pond will heat 120 MM lb. (54.55 MM kg.) of surface water from its preheated temperature of about 140° F. (60° C.) to about 200° F. (93° C.). Absent the preheating technique of the present invention, a solar pond covering about 200 acres, and having a depth of about 2½ inches, would be required to raise the 85° F. (29.4° C.) surface water to a temperature of 200° F. (93° C.). Since the solar pond, or flat-plate collector, represents an unusually large proportion of the capital expenditure for the entire installation, any reduction in its area affords significant economic advantages. The preheated surface water is introduced into a storage pond, or sump, which will be sized for at least a capacity equal to the quantity of sea water charged to the unit over a 24-hour operation period. Likewise, the storage pond into which the heated water from the solar radiation heat sink is introduced, is sized to accommodate the 24-hour capacity of the installation.

BRIEF DESCRIPTION OF DRAWING

In additionally describing my invention, reference will be made to the accompanying drawing which illustrates several embodiments thereof. These are presented by way of a simplified, schematic flow diagram in which details such as pumps, instrumentation and controls, valving, start-up lines and similar hardware have been eliminated on the grounds of being non-essential to a clear understanding of the techniques involved. The utilization of these miscellaneous appurtenances, to modify the illustrated process, is well within the purview of one skilled in the appropriate art, and the use thereof will not create a departure from the scope and the spirit of the appended claims.

DETAILED DESCRIPTION OF DRAWING

With specific reference now to the accompanying drawing, which illustrates one preferred embodiment of my invention, further description will be based upon the availability of surface sea water at a temperature of 85° F. (29.4° C.) and colder water at 70° F. (21.1° C.), obtainable at a reasonable depth below the surface. The solar pond 20 will be sized to raise the temperature of the preheated sea water to a level of about 200° F. (93° C.), prior to the introduction thereof into the vacuum flash zone system, and will have a capacity of about 120 MM lb. (54.55 MM kg.) which will satisfy an hourly charge rate (over a 24-hour period) of 5.0 MM lb. (2.27 kg.) to the initial vacuum flash zone 25.

Surface water from source 1 is introduced into the system through conduit 2 at a temperature of about 85° F. (29.4° C.), and is initially preheated to a temperature of about 97° F. (36.1° C.) in heat-exchanger 3, via indirect contact with about 65,000 lb/hr. (29,545 kg/hr.) of 100° F. (37.8° C.) vapors provided in line 4 from flash zone 5. The salinous water continues through line 6 into heat-exchanger 7, wherein the temperature is increased to about 111° F. (43.6° C.), via indirect contact with about 68,000 lb/hr. (30,909 kg/hr.) of a 115° F. (45.8° C.) vaporous phase in line 8, provided from flash zone 9.

The 111° F. (43.6° C.) salinous water passes through line 10 into heat-exchanger 11, wherein the temperature is increased to about 125° F. (51.8° C.), via indirect contact with about 70,000 lb/hr. (31,818 kg/hr.) of 130° F. (54° C.) non-salinous vapors provided in line 12 from flash zone 13. Salinous water continues through line 14 into heat-exchanger 15, wherein it contacts, indirectly, about 71,000 lb/hr. (32,273 kg/hr.) of 145° F. (62.8° C.) vapors in line 34, emanating from flash zone 16; the temperature is increased to a level of about 140° F. (60° C.). The thus-heated salinous sea water charge passes via conduit 17 into storage pond, or sump 18, from which it is introduced, by way of line 19 into solar pond 20, provided with covering 21 as previously described. Solar pond 20 is sized, and possesses an efficiency such that the 140° F. (60° C.) salinous sea water is heated to a temperature of about 200° F. (93° C.) over a period of about ten daylight hours. The hot sea water is introduced through line 22 into hot water storage pond, or sump 23. On the basis of 100 lb/hr. (45.45 kg/hr.) of salinous sea water charged to the unit, the solar pond duty, in BTU/hr., is 6,000 compared to 11,500 otherwise required absent the preheat system of the present invention.

Hot sea water from storage pond 23 is introduced, via line 24, into a first vacuum flash zone 25 which is maintained at a subatmospheric pressure of 4.74 psia. (245.13 mm. of Hg.), and which provides a non-salinous vaporous phase and a salinous liquid phase at a temperature of about 160° F. (71° C.). The vaporous phase, in the amount of about 199,500 lb/hr. (90,682 kg/hr.), passes via line 26 into and through turbine 27, from the resulting motion of which power is generated via generator 28 and power line 29. The exiting turbine vapors in line 30 are introduced thereby into cooler/condenser 31 wherein they are contacted by 70° F. (21.1° C.) sea water in line 51; potable water is recovered through line 32. As hereinafter described, a final flash zone 45 is employed to flash a salinous liquid phase in line 44 to a temperature of 75° F. (23.9° C.), being maintained at a subatmospheric pressure of about 0.43 psia. (22.24 mm. of Hg.). This will, as hereinafter stated, also be the downstream pressure with respect to turbine 27, which will possess, therefore, a pressure ratio of 4.74/0.43, or approximately 11.0:1.0; power is generated in the amount of about 11,135 HP-hrs. (8,301 kw-hrs.).

The 160° F. (71° C.) salinous liquid phase from flash zone 25, in the amount of about 4.80 MM lb./hr. (2.18 MM kg/hr.) is introduced via line 33 into flash zone 16 which is maintained at a subatmospheric pressure of about 3.28 psia. (169.63 mm. of Hg.). A vaporous phase, at a temperature of about 145° F. (62.8° C.) and in the amount of about 71,000 lb/hr (32,273 kg/hr.), is withdrawn by way of line 34, and introduced thereby into heat-exchanger 15. The latter increases the temperature of the 125° F. (51.8° C.) sea water in line 14 to about 140° F. (60° C.), at which temperature it is introduced via line 17 into warm water storage pond 18. Condensed vapors are recovered as potable water by way of lines 35 and 32. The liquid phase from flash zone 16, in the amount of about 4.37 MM lb/hr. (2.15 MM kg/hr.), is withdrawn through line 36, and introduced thereby into vacuum flash zone 13 which is maintained at a subatmospheric pressure of about 2.22 psia. (114.81 mm. of Hg.). A 130° F. (54° C.) vaporous phase, in the amount of about 70,000 lb/hr. (31,818 kg/hr.), is provided in line 12 through which it is introduced into heat-exchanger 11. Via indirect contact therein, the 111° F. (43.6° C.) salinous sea water in line 10 is increased in temperature to a level of about 125° F. (51.8° C.) and introduced via line 14 into heat-exchanger 15. Condensed vapors are recovered as potable water through conduits 37 and 32.

The salinous liquid phase from flash zone 13, in the amount of about 4.66 MM lb/hr. (2.12 MM kg/hr.) is introduced by way of line 38 into vacuum flash zone 9. The latter is maintained at a subatmospheric pressure of about 1.47 psia. (76.02 mm. of Hg.) to provide 115° F. (45.8° C.) vaporous and liquid phases. The former, in the amount of about 68,000 lb/hr. (30,909 kg/hr.), is withdrawn via conduit 8 and introduced thereby into heat-exchanger 7. As a result of indirect contact therein, the 97° F. (36.1° C.) sea water in line 6 is increased in temperature to about 111° F. (43.6° C.), and passes through line 10 into heat-exchanger 11. Condensed vapors from heat-exchanger 7 are recovered as potable water through lines 39 and 32.

The salinous liquid phase in line 40, withdrawn from flash zone 9 in the amount of about 4.59 MM lb/hr. (2.09 MM kg/hr.), is introduced thereby into vacuum flash zone 5. The latter is maintained at a subatmospheric pressure of about 0.95 psia. (49.13 mm. of Hg.) to provide liquid and vaporous phases at a temperature of about 100° F. (37.8° C.). The latter, in the amount of about 66,000 lb/hr. (30,000 kg/hr.), is introduced via line 4 into heat-exchanger 3, wherein the 85° F. (29.4° C.) surface sea water in line 2 is raised in temperature to a level of about 97° F. (36.1° C.). Not all the vapors condense in heat-exchanger 3; therefore, the stream exiting through conduit 41 contains about 8,000 lb/hr. (3,636 kg/hr.) of vapors, and is introduced into cooler/condenser 42. The cooling/condensing medium is a portion of deep sea water obtained from source 1 at a temperature of 70° F. (21.1° C.) through conduit 48. Condensate is recovered by way of lines 43 and 32 as potable water. The warmed salinous sea water is returned to source 1 via lines 49 and 50.

The liquid phase in line 44, in the amount of about 4.53 MM lb/hr. (2.06 MM kg/hr.), is introduced into a final vacuum flash zone 45 which is maintained at a subatmospheric pressure of about 0.43 psia. (22.24 mm. of Hg.), to provide vaporous and liquid phases at a temperature of about 75° F. (23.9° C.); the latter temperature is only 5° F. (2.8° C.) greater than the lowest sea water temperature of 70° F. (21.1° C.). Additional water, in the amount of about 107,500 lb/hr. (48,864 kg/hr.), is recovered by way of lines 46 and 30, cooler/-condenser 31 and line 32. The final salinous liquid phase from flash zone 45, in the amount of about 4.42 MM lb/hr. (2.01 MM kg/hr. ) is returned to sea water source 1 via conduits 47 and 50. A portion of the 70° F. (21.1° C.) sea water from source 1 is diverted from line 48, via line 51, and used in cooler/condenser 31. Potable water recovery may be summarized as follows: (1) exiting turbine vapors in line 30, 199,500 lb/hr. (90,682 kg/hr.); (2) condensed vapors from flash zone 16 in line 35, 71,000 lb/hr. (32,273 kg/hr.); (3) condensed vapors from flash zone 13 in line 37, 70,000 lb/hr. (31,818 kg/hr.); (4) condensed vapors from flash zone 9 in line 39, 68,000 lb/hr. (30,909 kg/hr.); (5) condensed vapors from flash zone 5, in line 43, 66,000 lb/hr. (30,000 kg/hr.); and, (6) vapors from flash zone 45 in line 46, 107,500 lb/hr. (48,864 kg/hr.). Total potable water recovery is 582,000 lb/hr. (264,545 kg/hr.), or about 13.97 MM lb/day (6.35 MM kg/day), or about 1.68 MM gal/-day (1.40 MM Imp. gal/day).

In the foregoing embodiment description, several subatmospheric pressures are employed with respect to the various vacuum flash separation zones. These are imposed by way of a vacuum source 54, with non-condensibles being removed from the system through line 63. With respect to turbine 27 and cooler/condenser 31, the lowest subatmospheric pressure is maintained by way of conduit 64 containing valve 65. With respect to flash zone 16 and heat-exchanger 15, the desired degree of vacuum is maintained by way of line 52 containing valve 53. Considering flash zone 13 and heat-exchanger 11, the subatmospheric pressure is imposed by way of lines 52 and 55, the latter containing valve 56. Conduits 52 and 57, the latter containing valve 58, maintain the vacuum within flash zone 9. Where 100% of the vapors in line 4 do not condense in heat-exchanger 3, but are condensed in cooler/condenser 42, the degree of vacuum within flash zone 5 is maintained by way of lines 52 and 61, the latter containing valve 62. Should all the vapors condense in exchanger 3, cooler/condenser 42 is not required, and the vacuum imposed upon flash zone 5 will be maintained by lines 52 and 59, the latter containing valve 60. With respect to final flash zone 45, the vacuum is maintained via lines 30 and 46, cooler/condenser 31 and line 64 containing valve 65.

As will be immediately recognized by those having the requisite skill in the appropriate art, and foregoing illustrated embodiment may be modified in a variety of ways by (1) increasing, or decreasing the number of flash zones used for power generation, (2) increasing, or decreasing the number of flash zones employed in the salinous sea water preheat section and/or, (3) varying the flash temperatures in the various zones. It is understood that such modifications will not remove the resulting process from the confines of my inventive concept, the scope and spirit of which is defined by the appended claims.

The foregoing specification, particularly when read in conjunction with the accompanying drawing, is believed to afford a clear understanding of my inventive concept and the processing techniques emcompassed thereby.

I claim as my invention:

1. A process for simultaneously recovering potable water and generating power from a source of salinous water, which process comprises the sequential steps of:
   (a) increasing the temperature of a first portion of said salinous water via indirect successive contact with a plurality of non-salinous vaporous phases which are (i) derived from said first salinous water portion and, (ii) obtained therefrom at elevated temperature and subatmospheric pressure;
   (b) introducing said first salinous water portion into a solar radiation heat sink, and therein exposing said first portion to radiant solar energy for a time sufficient to raise its temperature to a level of at least about 135° F.;
   (c) introducing the thus-heated first salinous water portion into the first of a series of flash separation zones, each succeeding one of which is maintained at a lower subatmospheric pressure, to provide a plurality of non-salinous vaporous phases, and through which the salinous liquid phase passes in series flow;
   (d) introducing at least one of said vaporous phases into a turbine, and generating power from the resulting motion thereof;
   (e) indirectly contacting said first salinous water portion, prior to the introduction thereof into said solar radiation heat sink, with each of the remaining vaporous phases in said plurality, and in the order of increasing temperatures, and recovering potable water from said remaining plurality of non-salinous vaporous phases; and,
   (f) indirectly contacting the exit vapors from said turbine with a second portion of said salinous water to recover additional potable water.

2. The process of claim 1 further characterized in that the salinous liquid phase, obtained from the last flash zone in said series, is introduced into a final flash separation zone, maintained at a lower absolute pressure than said last flash zone to provide a final nonsalinous vaporous phase and a final salinous liquid phase, cooling said final vaporous phase via indirect contact with said second portion of said salinous water, to recover additional potable water, said final liquid and vaporous phases being provided at a temperature not more than 15° F. greater than the temperature of said second salinous water portion, and returning said final salinous liquid phase to the source of said salinous water.

3. The process of claim 1 further characterized in that said first and second portions of salinous water are obtained at substantially the same temperature.

4. The process of claim 1 further characterized in that the temperature of said first salinous water portion is at least 5° F. greater than the temperature of said second salinous water portion.

5. The process of claim 4 further characterized in that a temperature differential of at least about 15° F. exists between said first and second salinous water portions.

6. The process of claim 1 further characterized in that said series of flash separation zones comprises from three to about twenty individual vacuum flash chambers.

7. The process of claim 6 further characterized in that said series comprises about four to about ten individual vacuum flash chambers.

8. The process of claim 1 further characterized in that said first salinous water portion is maintained within said solar radiation heat sink for a time to increase its temperature to a level in the range of about 160° F. to about 210° F.

9. The process of claim 1 further characterized in that said solar radiation heat sink is a solar pond.

10. The process of claim 1 further characterized in that said solar radiation heat sink is a flat plate collector.

11. The process of claim 2 further characterized in that said final flash separation zone is maintained at a subatmospheric pressure from about 0.25 psia. to about 0.75 psia.

* * * * *